(12) United States Patent
Watada

(10) Patent No.: US 8,069,961 B2
(45) Date of Patent: Dec. 6, 2011

(54) DISK BRAKE APPARATUS

(75) Inventor: Akifumi Watada, Nagano (JP)

(73) Assignee: Nissin Kogyo Co., Ltd, Nagano (JP)

( * ) Notice: Subject to any disclaimer, the term of this patent is extended or adjusted under 35 U.S.C. 154(b) by 743 days.

(21) Appl. No.: 12/113,380

(22) Filed: May 1, 2008

(65) Prior Publication Data

US 2009/0014257 A1    Jan. 15, 2009

(30) Foreign Application Priority Data

May 9, 2007    (JP) .............................. P. 2007-124167

(51) Int. Cl.
*F16D 55/08*    (2006.01)
(52) U.S. Cl. ...................................... 188/72.8; 188/71.9
(58) Field of Classification Search ................. 188/72.7, 188/71.1, 72.1, 72.6, 72.8
See application file for complete search history.

(56) References Cited

U.S. PATENT DOCUMENTS

| | | | | |
|---|---|---|---|---|
| 3,638,763 A | * | 2/1972 | Laverdant | 188/72.6 |
| 3,805,924 A | * | 4/1974 | Gambardella | 188/72.6 |
| 3,920,102 A | * | 11/1975 | Ito | 188/71.9 |
| 3,934,684 A | * | 1/1976 | Evans | 188/71.9 |
| 3,952,843 A | * | 4/1976 | Campbell et al. | 188/71.4 |
| 3,991,859 A | * | 11/1976 | Coulter et al. | 188/71.9 |
| 4,030,576 A | * | 6/1977 | Pringle | 188/71.8 |
| 4,031,986 A | * | 6/1977 | Thompson | 188/72.4 |
| 4,159,754 A | * | 7/1979 | Airheart et al. | 188/71.8 |
| 5,000,294 A | * | 3/1991 | Hunnicutt et al. | 188/71.9 |
| 5,038,895 A | * | 8/1991 | Evans | 188/72.7 |
| 5,060,765 A | * | 10/1991 | Meyer | 188/71.9 |
| 5,462,137 A | * | 10/1995 | Aubry et al. | 188/72.6 |
| 5,788,024 A | * | 8/1998 | Meyer | 188/72.7 |
| 5,829,557 A | * | 11/1998 | Halasy-Wimmer et al. | 188/162 |
| 6,311,809 B1 | * | 11/2001 | Thomas et al. | 188/72.9 |

(Continued)

FOREIGN PATENT DOCUMENTS

JP    2000-320588    11/2000

(Continued)

OTHER PUBLICATIONS

Office Action for Japanese Application No. 2007-124167 drafting dated Oct. 1, 2010 (English language translation attached) (Dispatch dated Oct. 12, 2010).

*Primary Examiner* — Robert Siconolfi
*Assistant Examiner* — Stephen Bowes
(74) *Attorney, Agent, or Firm* — Andrew M. Calderon; Roberts Mlotkowski Safran & Cole, P.C.

(57) ABSTRACT

Engaging grooves 8*e* extending in the cylinder axial direction and circumferential grooves 8*f* formed in a cylinder axial direction middle portion of the engaging grooves 8 are formed on a bottom side of a cylinder hole 8. Engaging rib 12*b* engaging with the engaging groove 8*e* and engaging rib 16*d* which engages with the engaging groove 8*e* and fits to the circumferential groove 8*f* are formed on a fixed side cam plate 12 and a housing, respectively. A bleeder hole 8*g* which penetrates communicates with the engaging grooves 8*e* and circumferential grooves 8*f* of the cylinder hole 8 is drilled in a caliper body 2. Communication holes 16*h* which allow communication between the inside and outside of the housing 16 is formed at a bottom side of the cylinder hole 8 rather than the engaging rib 16*f* of the housing.

16 Claims, 4 Drawing Sheets

U.S. PATENT DOCUMENTS

| | | | | |
|---|---|---|---|---|
| 6,811,002 | B2 * | 11/2004 | Nakayama et al. | 188/71.9 |
| 6,938,736 | B2 * | 9/2005 | Takahashi | 188/72.1 |
| 2004/0245055 | A1 * | 12/2004 | Gerard et al. | 188/72.6 |
| 2006/0124407 | A1 * | 6/2006 | Maehara | 188/72.7 |
| 2007/0045062 | A1 * | 3/2007 | Watada | 188/72.8 |
| 2007/0227837 | A1 * | 10/2007 | Barbosa et al. | 188/72.7 |

FOREIGN PATENT DOCUMENTS

| | | |
|---|---|---|
| JP | 2004286202 | 10/2004 |
| JP | 2006266282 | 10/2006 |
| JP | 2006266346 | 10/2006 |

* cited by examiner

DISK BRAKE APPARATUS

BACKGROUND OF THE INVENTION

1. Field of the Invention

The present invention relates to a disk brake apparatus and, specifically, to a disk brake apparatus which includes a piston for pushing a friction pad in accordance with a hydraulic pressure, an adjuster for automatically adjusting a clearance between the friction pad and a disk rotor, and a parking brake for pushing the piston through the adjuster by a ball ramp type thrust conversion mechanism.

2. Description of Related Art

As disk brake apparatuses for use in a four-wheel drive car, there are known a disk brake apparatus with a parking brake which includes a hydraulic pressure type operation mechanism using a brake pedal and a mechanical type operation mechanism pulled and operated by a hand lever or a foot pedal.

In this disk brake apparatus with a parking brake, generally, a piston constituting a hydraulic pressure type operation mechanism is disposed on a leading end opening side of a cylinder hole formed in a caliper body, an adjuster which includes an adjust nut and an adjust bolt is disposed on the rear surface side of this piston and a thrust conversion mechanism which constitutes a mechanical type operation mechanism is disposed on the bottom side of the cylinder hole.

As the thrust conversion mechanism, conventionally, there is widely used a ball ramp type thrust conversion mechanism. This conventional ball ramp type thrust conversion mechanism is structured in the following manner.

That is, a fixed side cam plate and a drive side cam plate, which respectively include a ramp groove for accommodating a cam bearing therein, are disposed opposed to each other; the drive side cam plate is rotated by the operation of the parking brake. Due to this rotation, by a cam action generated between the ramp groove and cam bearing, thrust force which can move a piston toward a disk rotor is generated and by this thrust force, the piston is moved in the direction of the disk rotor through the adjuster to press the friction pad against the disk rotor, thereby obtaining a braking force.

There is also known a disk brake apparatus in which a substantially cylindrical housing which accommodates the fixed side cam plate, drive side cam plate, a thrust transmission plate and a cam spring for energizing the thrust transmission plate in the direction of the drive side cam plate, and which is disposed on a bottom side of the cylinder hole, thereby enhancing the efficiency of the operation to assembly the disk brake apparatus (for example, see Japanese Patent Unexamined Publication JP-A-2000-320588).

However, in the above-mentioned disk brake apparatus, it takes much time and troublesome to discharge air mixed in hydraulic fluid charged into the cylinder hole and, especially, in the housing, it is difficult to discharge the air of the hydraulic fluid therefrom, resulting in the poor efficiency of the operation of the disk brake apparatus.

SUMMARY OF THE INVENTION

In view of the above, it is an object of the invention to provide a disk brake apparatus which, while employing a simple structure, can remove the air of the hydraulic fluid charged into the cylinder hole positively and easily, thereby enhancing the efficiency of the operation and maintenance of the disk brake apparatus.

In attaining the above object, according to the invention, there is provided a disk brake apparatus, including:

a piston accommodated on a leading end opening side of a cylinder hole formed in a caliper body;

a thrust conversion mechanism disposed on a bottom side of the cylinder hole;

an adjuster which includes an adjust nut and an adjust bolt and is interposed between the thrust conversion mechanism and the piston and a parking brake which pushes the piston from the thrust conversion mechanism through the adjuster, wherein the thrust conversion mechanism includes:

a fixed side cam plate mounted on a bottom wall of the cylinder hole;

a cam shaft which penetrates through the cylinder hole so as to be rotatable with respect to the bottom wall of the cylinder hole and the fixed side cam plate and also to be movable in a direction of a cylinder shaft;

a drive side cam plate provided on the cylinder hole opening side of the cam shaft;

ramp grooves formed at mutually opposed positions of the drive side cam plate and fixed side cam plate, respectively and cam bearings accommodated into their associated ramp grooves, respectively, the adjuster includes a thrust transmission plate in the bottom side end portion of the cylinder hole which opposes one of the drive side cam plates of the adjust nut or the adjust bolt, a substantially cylinder housing accommodates the fixed side cam plate, the drive side cam plate, the thrust transmission plate, a cam spring which energizes the thrust transmission plate in the direction of the drive side cam plate, engaging grooves extending in the cylinder axis direction are formed on the bottom side of the cylinder hole and circumferential grooves are formed on the engaging groove in a cylinder axial direction middle portion, the housing includes engaging ribs which engages with the engaging grooves and the circumferential grooves, a liquid passage hole which allows communication between the engaging grooves and the circumferential grooves is formed on the caliper body and a communication hole which allows communication between inside and outside of the housing is formed on a portion of the housing where is near to the bottom side rather than the engaging rib.

According to the disk brake apparatus of the invention, the air of the hydraulic fluid can be discharged properly through the communication holes formed in the housing and a liquid passage hole formed so as to communicate with the engaging grooves of the cylinder hole. Further, the air mixed into the hydraulic fluid within the housing can be discharged surely.

Further, since the engaging ribs provided on the housing are formed by cutting and raising the peripheral wall of the housing, spaces formed by cutting and raising the peripheral wall can be used as communication holes which allows the communication between the inside and outside of the housing. This eliminates need an operation of forming communication holes separately, thereby being able to reduce the cost of the disk brake apparatus.

DETAILED DESCRIPTION OF THE PREFERRED EMBODIMENTS

Hereinafter, description will be given below in detail of a disk brake apparatus according to an embodiment of the invention with reference to the accompanying drawings.

Figure 1:
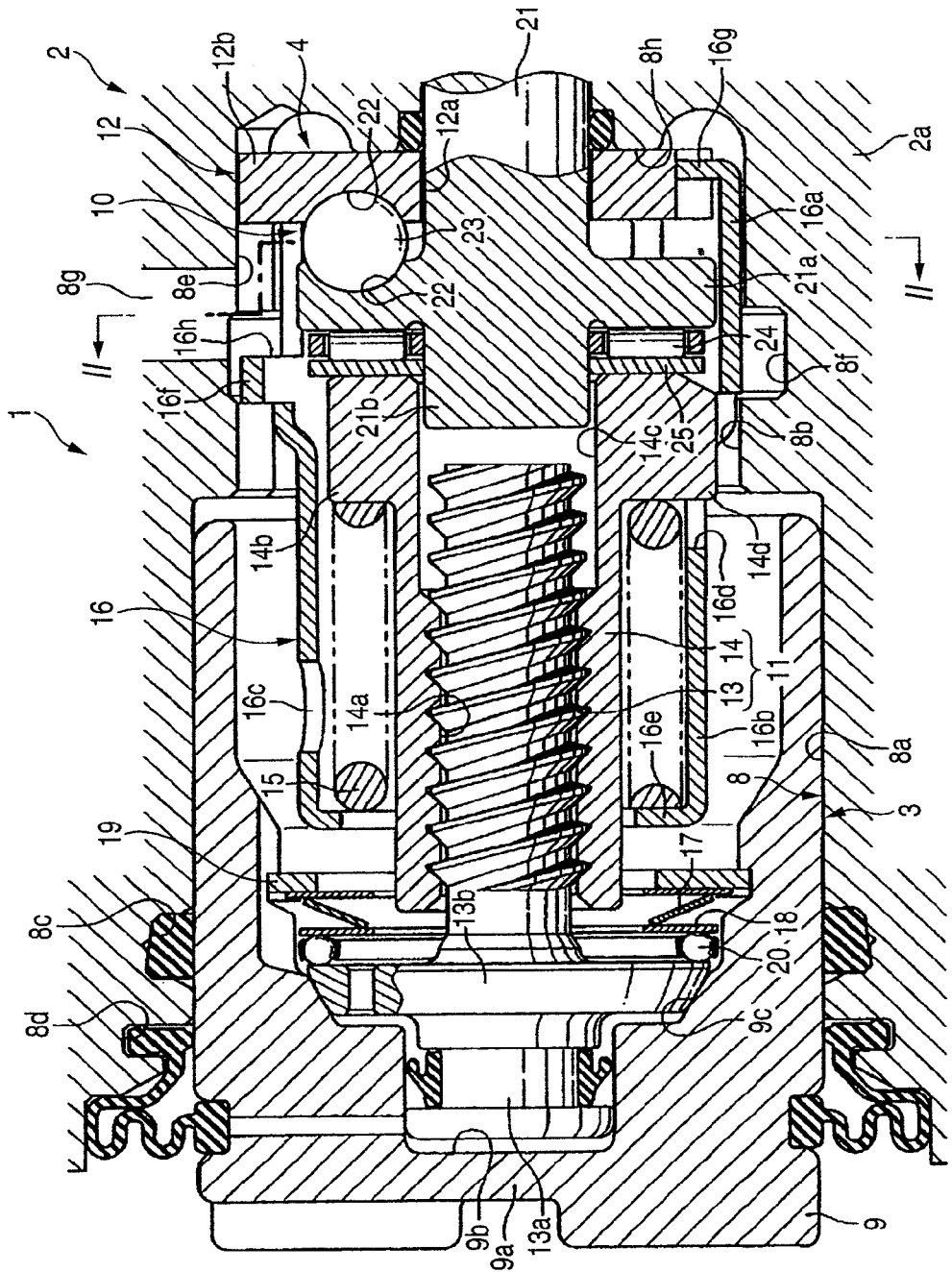
FIG. 1 is an enlarged section view of the main portions of a disk brake apparatus according to an embodiment of the invention.
Figure 2:
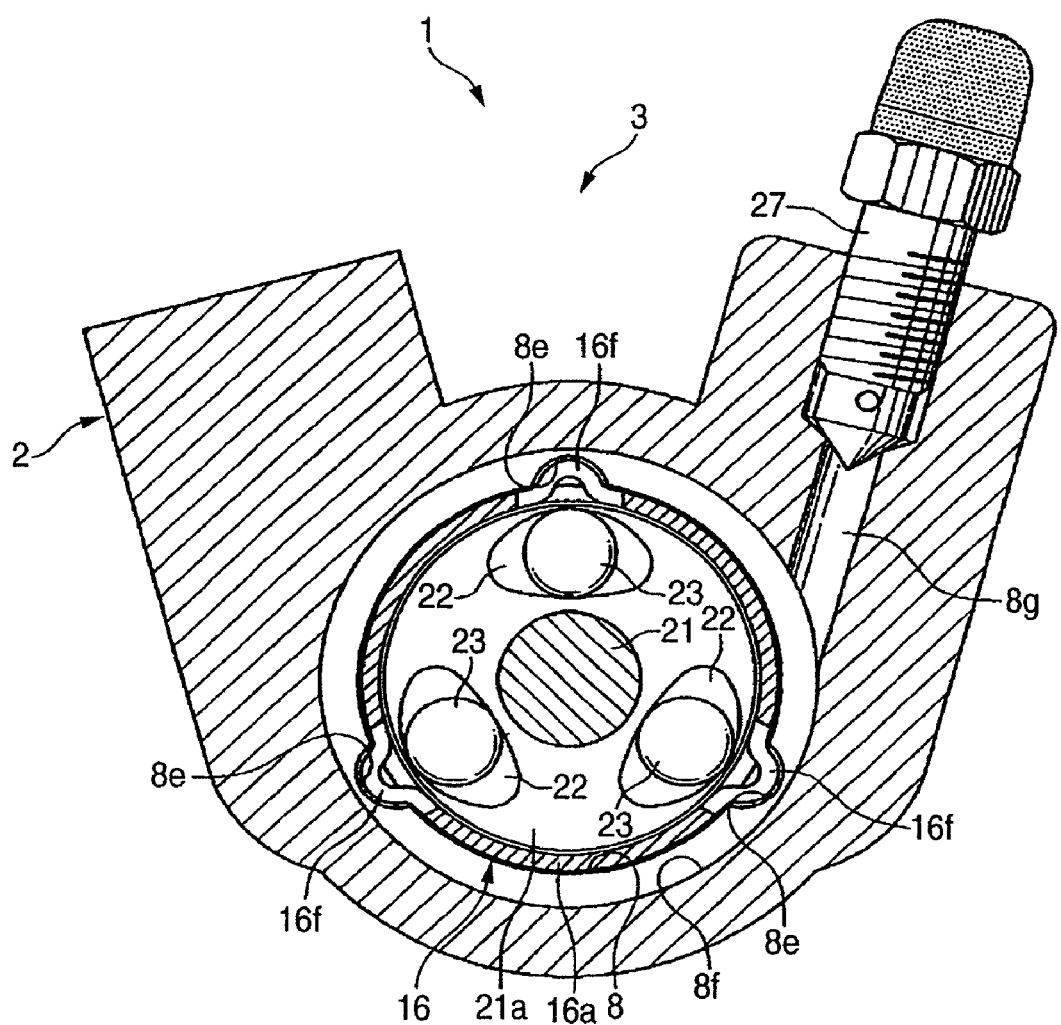
FIG. 2 is a section view taken along the II-II line shown in FIG. 1.
Figure 3:
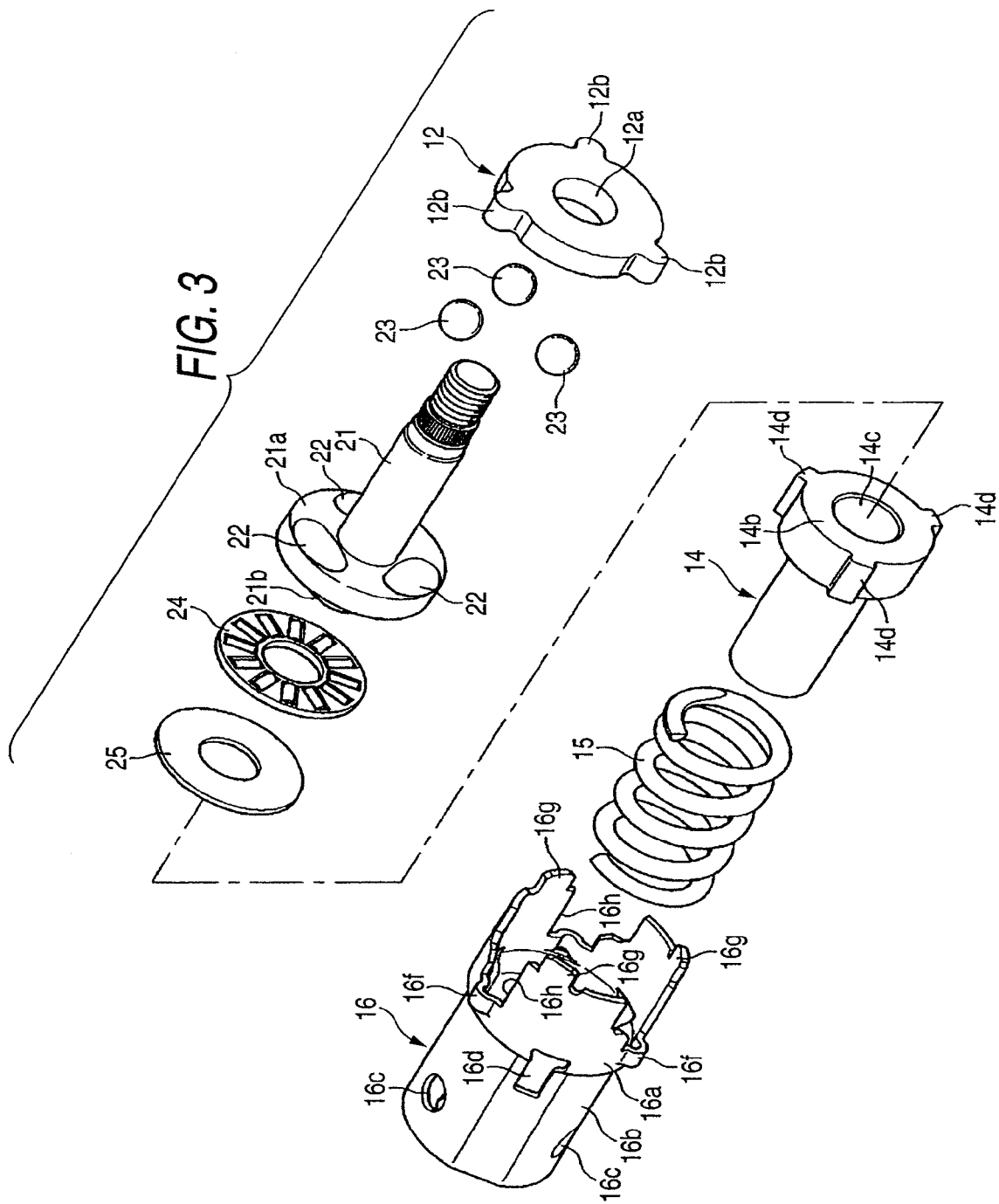
FIG. 3 is an exploded perspective view of a thrust conversion mechanism, an adjust nut and a housing shown in FIG. 1.
Figure 4:
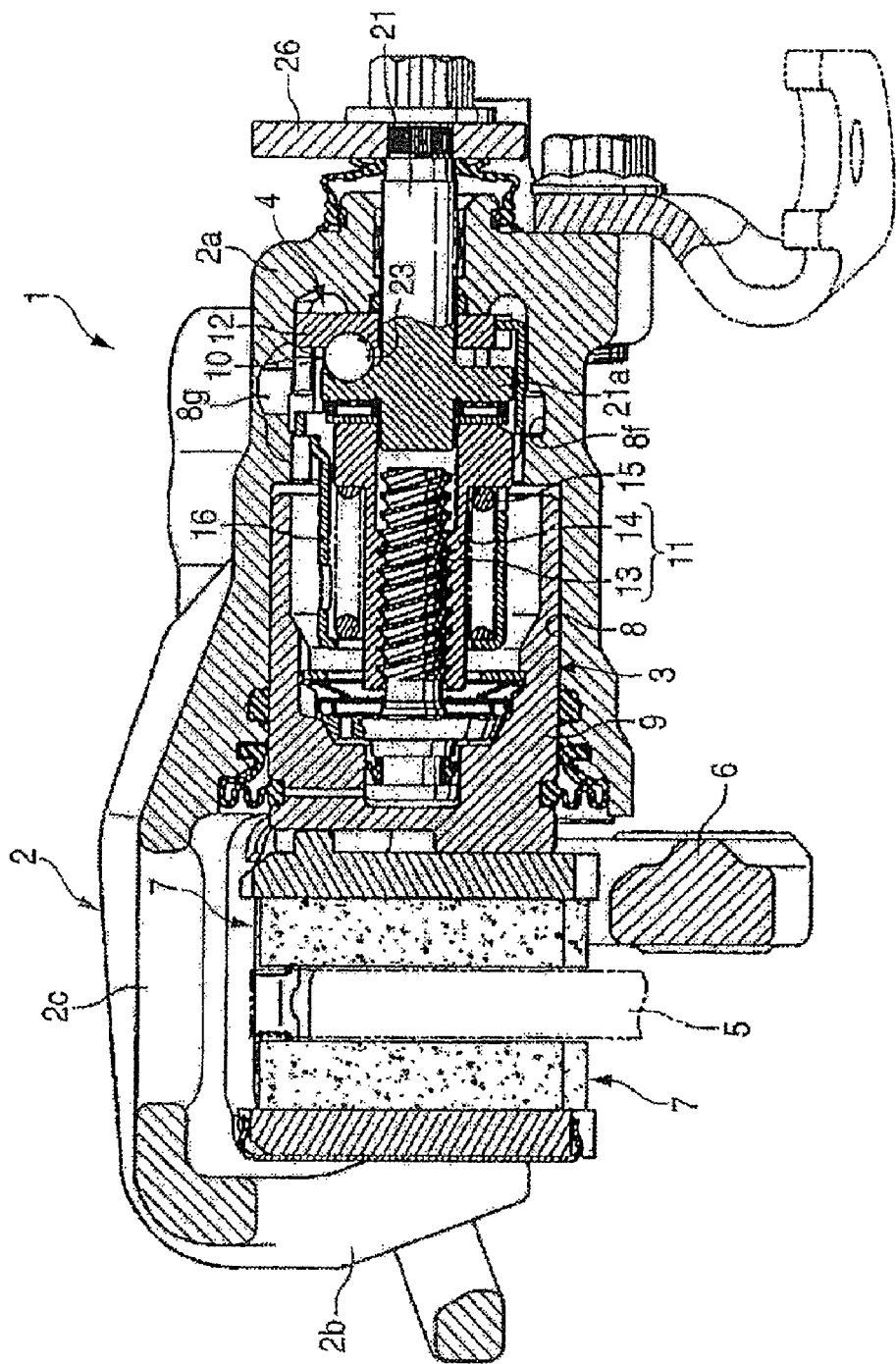
FIG. 4 is a front section view of the disk brake apparatus shown in FIG. 1.

FIG. 1 is an enlarged section view of the main portions of the disk brake apparatus, FIG. 2 is a section view taken along the II-II line shown in FIG. 1, FIG. 3 is an exploded perspective view of a thrust conversion mechanism, an adjust nut and a housing respectively included in the disk brake apparatus, and FIG. 4 is a front section view of the disk brake apparatus.

A disk brake apparatus 1 according to the embodiment is a disk brake apparatus with a parking brake which includes, a hydraulic pressure type operation mechanism 3 operated by a brake pedal in a caliper body 2 and a mechanical type operation mechanism 4 for a parking brake operated by a hand lever or a foot pedal (neither of which are shown). The caliper body 2 is movably supported on a caliper bracket 6 to be fixed to a car body on one side portion of a disk rotor 5 in such a manner that it can be moved in a disk axial direction through a pair of slide pins (not shown).

The caliper body 2 includes an acting portion 2a and a reacting portion 2b respectively disposed on the two side of the disk rotor 5 in such a manner that they are opposed to each other and a bridge portion 2c which straddles over the outside of the disk rotor 5 to connect together the acting and reacting portions 2a and 2b. A pair of friction pads 7, 7 is interposed between the acting and reacting portions 2a and 2b so as to sandwich the disk rotor 5 therebetween.

On the acting portion 2a, a cylinder hole 8b opened to the disk rotor side is formed. In the cylinder hole 8, a large-diameter portion 8a is formed on a leading end opening side of the cylinder hole 8 and a small-diameter portion 8b is formed on the cylinder hole bottom side of the cylinder hole 8. On the large-diameter portion 8a, a seal groove 8c and a boot groove 8d are formed along circumferential direction. On the small-diameter portion 8b, three engaging grooves 8e are formed in a cylinder axial direction with equal intervals in a circumferential direction of the small-diameter portion 8b. A circumferential groove 8f which connects together axial direction middle portions of the engaging grooves 8e is formed in the cylinder hole 8. Further, on an upper portion side of the acting portion 2a, a bleeder hole 8g (a liquid passage hole) is drilled. The bleeder hole communicates with one of the engaging groove 8e and the circumferential groove 8f and positioned vehicular upper side when assembling it to the vehicle.

A bottomed cylindrical piston 9 which constitutes the hydraulic pressure type operation mechanism 3 is accommodated within the large-diameter portion 8a of the cylinder hole 8. A thrust conversion mechanism 10 which constitutes the mechanical type operation mechanism 4 is accommodated within the small-diameter portion 8b of the cylinder hole 8. An adjuster 11 which automatically adjusts a braking clearance between the disk rotor 5 and friction pad 7 is disposed between the piston 9 and thrust conversion mechanism 10. Further, a fixed side cam plate 12 is provided on the bottom wall of the cylinder hole 8h of the small-diameter portion 8b.

The adjuster 11 includes an adjust bolt 13 and an adjust nut 14. A small-diameter piston 13a and a clutch plate 13b are formed on a head portion of the adjust bolt 13. In the adjust nut, a multiple thread screw 14a which threadedly engages with the adjust bolt 13 is formed in interior of the adjust nut 14 and the thrust transmission plate 14b is provided on an end portion of the cylinder hole side. Further, on an outer circumferential side of the adjust nut 14, a cylindrical housing 16 which houses the cam spring 15 and the thrust transmission plate 14b is disposed within the cylinder hole 8.

The piston 9 is accommodated in the large-diameter portion 8a of the cylinder hole 8 so that its bottom wall 9a faces the disk rotor. The adjust nut 14 and the adjust bolt 13 are provided on a central axis of the interior of the piston 9. A fit hole 9b is formed on an inner surface of the bottom wall of the piston 9. The small-diameter piston 13a fits to the fit hole 9b via a seal member. A clutch plate 13b is urged and contacts with a conical surface 9c of the piston 9 of which diameter expands from an opening of the fit hole 9b due to an effect of a spring member 17.

One end of the spring member 17 contacts with a bearing receiver 18 and the other end contacts with a snap ring 19 provided on an outer peripheral portion of the adjust nut 14. The spring member 17 energizes the adjust bolt 13 toward the bottom wall 9a side through the bearing receiver 18 and a bearing 20 in a rotatable state.

The thrust conversion mechanism 10 includes: a cam shaft 21 which penetrates through the cylinder hole 8 so as to be rotatable with respect to the bottom wall of the cylinder hole 8h and the fixed side cam plate 12 and also to be movable in a cylinder axial direction; a drive side cam plate 21a provided on the cylinder hole opening side end portion of the cam shaft 21; three ramp grooves 22 respectively formed at the opposed positions of and the drive side cam plate 21a and the fixed side cam plate 12 and three cam bearings 23 accommodated in the ramp grooves 22, respectively.

The drive side cam plate 21a includes a cylindrical portion 21b which is protrudely provided on the center of the cylinder hole opening side end portion thereof. The thrust transmission plate 14b contacts with a side surface of the cylinder hole opening of the drive side cam plate 21a through a thrust bearing 24 and a spacer 25.

The thrust transmission plate 14b includes, a accommodating hole 14c which accommodates the cylindrical portion 21b and a screw leading end portion of the adjust bolt 13 on the center of the cylinder hole bottom side end portion thereof. Further, three engaging projecting portions 14d are formed on the outer periphery of the thrust transmission plate 14b such that they are spaced from each other at regular intervals in the circumferential direction.

The fixed side cam plate 12 is formed in a disk shape and includes: an insertion hole 12a which is formed in the central portion of the cam plate 12 and through which the cam shaft 21 can be inserted; and three engaging ribs 12b which are protrudely provided on the outer peripheral side of the cam plate 12 at regular intervals in the circumferential direction and which engages with the engaging grooves 8e of the cylinder hole 8, respectively.

The housing 16 includes a large-diameter cylinder portion 16a and a small-diameter portion 16b which are formed integrally. The diameter of the large-diameter cylinder portion 16a is formed slightly smaller than that of the small-diameter portion 8b of the cylinder hole 8. The small-diameter portion cylinder portion 16b is formed to have an inside diameter larger than the outside diameter of the thrust transmission plate 14b formed in the adjust nut 14. Three penetration holes 16c which penetrates through the inside and outside of the housing 16 are drilled on a peripheral wall of the small-diameter cylinder portion 16b.

Three engaging holes 16d, to which the respective engaging projecting portions 14d fit so as to be movable only in axial direction, are drilled from the cylinder hole opening side of the small-diameter cylinder portion 16b to the cylinder hole bottom side of the large-diameter cylinder portion 16a. A support piece 16e for the cam spring 15 is projectingly provided on the inner peripheral side of the cylinder opening side end portion of the small-diameter cylinder portion 16b. There three engaging ribs 16f, which engages with their associated engaging grooves 8e of the cylinder hole 8 and also fits to their associated circumferential grooves 8f, are projectingly provided on the cylinder hole bottom side of the large-diameter cylinder portion 16a at regular intervals in the circumferential direction.

The peripheral wall of the large-diameter cylinder portion 16a interposed between the mutually adjoining ribs 16f thereof is extended toward the cylinder hole bottom portion and bent pieces 16g which can be engaged with the peripheral wall of the fixed side cam plate 12 are provided on the peripheral wall. Also, the portions of the engaging ribs 16f, which exist on the cylinder hole bottom portion and are interposed between the mutually adjoining bent pieces 16g, provide air gap portions. After the disk brake apparatus is assembled, the air gap portions serve as communication holes 16h which allow communication between the inside and outside of the housing 16.

The assembling method of the thus structured disk brake apparatus 1 according to the present embodiment is as follows.

The cam spring 15 is inserted from the opening of the housing 16 that is formed on the cylinder hole bottom portion so that one end of the cam spring 15 contacts with the support piece 16e and the adjust nut 14 is inserted through the inner periphery of the cam spring 15. The other end of the cam spring 15 is made contact with the cylinder hole opening side end portion of the thrust transmission plate 14b provided on the adjust nut 14 and the engaging projecting portion 14d of the adjust nut 14 is engaged with the engaging hole 16d of the housing 16, thereby preventing the thrust transmission plate 14b from rotation while the thrust transmission plate 14 can move in the cylinder axial direction.

Next, the cylindrical portion 21b of the drive side cam plate 21a, into which the spacer 25 and thrust bearing 24 are inserted, is accommodated within the accommodating hole 14c of the thrust transmission plate 14b. The cylinder hole bottom side of the thrust transmission plate 14b and the cylinder hole opening end portion of the drive side cam plate 21a are contacted with each other through the spacer 25 and thrust bearing 24.

After then, the cam shaft 21 is inserted through the insertion hole 12a of the fixed side cam plate 12 so that the cam bearings 23 can be accommodated in their associated ramp grooves 22. The positions of the engaging ribs 12b of the fixed side cam plate 12 and the positions of the engaging ribs 16f of the housing 16 are matched to each other in the cylinder axial direction, and the bent pieces 16g of the housing 16 are bent and are thereby engaged with the peripheral wall of the fixed side cam plate 12.

Thus, the fixed side cam plate 12 is disposed on the cylinder hole bottom side of the housing 16 and the thrust conversion mechanism 10, the thrust transmission plate 14b and the cam spring 15 can be assembled into the housing 16 to thereby form them as a unit. Further, the engaging ribs 12b of the fixed side cam plate 12 and the engaging ribs 16f of the housing 16 are disposed on the same line in the cylinder axial direction.

The thus assembled unit is inserted into the cylinder hole 8 so that the fixed side cam plate 12 faces the bottom wall of the cylinder hole 8h. The engaging ribs 12 of the fixed side cam plate 12 and the engaging ribs 16f of the housing 16f are respectively engaged into the engaging grooves 8e formed in the small-diameter portion 8b of the cylinder hole 8, the engaging ribs 16f of the housing 16 are respectively engaged with their associated peripheral grooves 8f, and the cam shaft 21 projecting from the fixed side cam plate 12 is projected externally from the insertion hole 12a of the bottom wall of the cylinder hole 8h.

By engaging the engaging ribs 12b of the fixed side cam plate 12 and the engaging ribs 16f of the housing 16 with their associated engaging grooves 8e of the cylinder hole 8 in this manner, the fixed side cam plate 12 and housing 16 can be prevented from rotation. Also, the communication holes 16h formed in the housing 16 are respectively disposed at the positions of their associated engaging grooves 8e which communicate with the bleeder hole 8g, and the inside of the housing 16 and the above-mentioned bleeder hole 8g are allowed to communicate with each other through the communication holes 16h and engaging grooves 8e.

On the other hand, the adjust bolt 13, a bearing 20, a bearing receiver 18, a spring member 17 and a retaining ring 19 are mounted to an interior of the piston 9 in this order and they form as one unit. Next, while bringing the adjust bolt 13 into threaded engagement with the adjust nut 14, the piston 9 is pushed into the cylinder hole 8 and an operation lever 26 is mounted onto the projecting end of the cam shaft 21. By assembling as such, the hydraulic pressure type operation mechanism 3, the mechanical type operation mechanism 4 and the adjuster 11 are assembled into the caliper body 2. Here, the respective seals may be mounted at a proper stage.

The hydraulic fluid is charged into the cylinder hole 8 of the thus assembled disk brake apparatus 1. Here, in order to discharge air that has been mixed into the hydraulic fluid, the brake pedal is used several times to move the air to the bleeder hole 8g side together with the hydraulic fluid, and a bleeder screw 27 mounted on the bleeder hole 8g is loosened, thereby discharge the air together with the hydraulic fluid from the bleeder hole 8g. In this air discharge operation, even when the air has been mixed into the hydraulic fluid charged into the housing,
the air can be easily discharged to the outside from the bleeder hole 8g through the engaging grooves 8e and circumferential grooves 8f of the cylinder hole by passing through the penetration holes 16c and communication holes 16h formed in the housing 16.

According to the disk brake apparatus 1, in the brake operation using the hydraulic pressure type operation mechanism 3, the piston 9 is pushed into the disk rotor direction due to the pressure of the hydraulic fluid introduced into the cylinder hole 8 to thereby push the friction pad 7 of the acting portion 2a against one side surface of the disk rotor 5. At this time, owing to the reacting force thereof, the caliper body 2 is moved in the direction of the acting portion 2a, and the reacting portion 2b pushes the friction pad 7 of the reacting portion 2b against the other side surface of the disk rotor 5, thereby carrying out a braking operation.

In this case, when the braking clearance between the friction pad 7 and disk rotor 5 is within a certain range, the piston 9 is allowed to move only by an amount equivalent to a backlash between the adjust bolt 13 and adjust nut 14, so that no adjusting operation is carried out.

When the braking clearance between the friction pad 7 and disk rotor 5 exceeds the certain range due to the abrasion of the friction pad 7, the piston 9 moves greatly toward the disk rotor 5 beyond the backlash amount to rotate and move forward the adjust bolt 13, whereby the clutch plate 13b and the conical surface 9c of the piston 9 are contacted with each other. When removing the braking operation in this state, the piston 9 and adjust bolt 13 are moved back by an amount equivalent to the backlash, whereby the braking clearance between the friction pad 7 and disk rotor 5 can be automatically adjusted to a certain range.

Also, in the parking brake operation using the mechanical type operation mechanism 4, when the operation lever 26 is operated and rotated by using the hand lever or the foot pedal, the drive side cam plate 21a is rotated together with the cam shaft 21, the phase of the respective ramp grooves 22 of the drive side cam plate 21a shifts from the phase of the respective ramp grooves 22 of the fixed side cam plate 12 which is held in a non-rotating state. As a result of this, the cam bearings 23 respectively move to shallow portions of their associated ramp grooves 22 and thus the drive side cam plate 21a moves toward the disk rotor 5 so as to be away from the fixed side cam plate 12. This movement of the drive side cam plate 21a in the axial direction is transmitted from the adjust nut 14 through the adjust bolt 13 to the piston 9 to provide a thrust which pushes the piston 9 toward the disk rotor 5, thereby carrying out a braking operation similarly to the braking operation using the above-mentioned hydraulic pressure type operation mechanism 3.

According to the above-mentioned disk brake apparatus, since the discharge of the air of the hydraulic fluid charged in the cylinder hole 8 can be carried out easily and surely with a simple structure, the efficiency of the operation and maintenance of the disk brake apparatus can be enhanced, and a braking operation using the hydraulic pressure type operation mechanism 3 can be always executed stably and positively.

The invention is not limited to the above-mentioned embodiment. For example, the engaging ribs to be formed in the housing may be formed by cutting and raising the peripheral wall of the housing, and space formed by cutting and raising the peripheral wall may be used as communication holes which allow communication between the inside and outside of the housing. This can eliminate the need for an operation to form such communication holes separately, thereby being able to reduce the cost of the disk brake apparatus. Also, in the above-mentioned embodiment, as the liquid passage hole which communicates with the engaging grooves and circumferential grooves, the bleeder hole is used. However, as the liquid passage hole, there may be used a union hole. Further, the invention is not limited to the structure where a thrust transmission plate is provided on an adjust nut and the adjust nut is accommodated into a housing, but it is also possible to employ a structure where a thrust transmission plate is provided on an adjust bolt and the adjust bolt is accommodated into a housing.

While the invention has been described in connection with the exemplary embodiments, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A disk brake apparatus, comprising:
    a piston accommodated on a leading end opening side of a cylinder hole formed in a caliper body;
    a thrust conversion mechanism disposed on a bottom side of the cylinder hole;
    an adjuster which comprises an adjust nut and an adjust bolt and is interposed between the thrust conversion mechanism and the piston and
    a parking brake which pushes the piston from the thrust conversion mechanism through the adjuster, wherein
    the thrust conversion mechanism comprises:
        a fixed side cam plate mounted on a bottom wall of the cylinder hole;
        a cam shaft which penetrates through the cylinder hole so as to be rotatable with respect to the bottom wall of the cylinder hole and the fixed side cam plate and also to be movable in an axial direction of the cylinder hole;
        a drive side cam plate provided on the cylinder hole opening side of the cam shaft;
        ramp grooves formed at mutually opposed positions of the drive side cam plate and the fixed side cam plate, respectively and
        cam bearings accommodated into their associated ramp grooves, respectively,
    the adjuster comprises a thrust transmission plate provided on an end portion of the adjust nut or the adjust bolt at in the bottom side of the cylinder hole, the thrust transmission plate facing the drive side cam plate,
    a substantially cylinder housing accommodates the fixed side cam plate, the drive side cam plate, the thrust transmission plate, a cam spring which energizes the thrust transmission plate toward the drive side cam plate,
    engaging grooves, extending in the cylinder hole axial direction, are formed on the bottom side of the cylinder hole and a circumferential groove is formed to connect the engaging grooves at middle portions thereof in the cylinder hole axial direction,
    the housing comprises:
        at least one engaging rib which is entered into the circumferential groove and to be engaged with a corresponding one of the engaging grooves; and,
        at least one communication hole which is formed in the housing at the bottom side of the cylinder hole with respect to the engaging rib,
    the circumferential groove is formed to be deeper than the engaging grooves in a radial direction of the cylinder hole; and
    a liquid passage hole is formed on the caliper body to be connected to the corresponding one of the engaging grooves and the circumferential groove.

2. The disk brake apparatus as set forth in claim 1, wherein the engaging rib includes cut and raised portions of a peripheral wall of the housing.

3. The disk brake apparatus as set forth in claim 1, wherein the housing includes a large-diameter cylinder portion and a small-diameter portion cylinder portion which are formed integrally.

4. The disk brake apparatus as set forth in claim 3, wherein:
    the large-diameter cylinder portion is formed smaller than that of a small-diameter portion of the cylinder hole; and
    the small-diameter cylinder portion is formed to have an inside diameter larger than an outside diameter of the thrust transmission plate.

5. The disk brake apparatus as set forth in claim 3, wherein the communication hole is a plurality of communication holes which penetrates through the inside and outside of the housing.

6. The disk brake apparatus as set forth in claim 3, further comprising penetration holes on a peripheral wall of the small-diameter cylinder portion of the housing.

7. The disk brake apparatus as set forth in claim 3, wherein the housing further comprises engaging holes, wherein engaging projecting portions fit into the engaging holes so as to be movable only in an axial direction.

8. The disk brake apparatus as set forth in claim 7, wherein the engaging holes are provided from a cylinder hole opening side of the small-diameter cylinder portion to a cylinder hole bottom side of the large-diameter cylinder portion.

9. The disk brake apparatus as set forth in claim 8, wherein there-are three engaging holes.

10. The disk brake apparatus as set forth in claim 3, wherein the housing further comprises a support piece structured to support a cam spring.

11. The disk brake apparatus as set forth in claim 10, wherein the support piece is projectingly provided on an inner peripheral side of a cylinder opening side end portion of the small-diameter cylinder portion.

12. The disk brake apparatus as set forth in claim 1, further comprising additional engaging ribs which engage with associated engaging grooves.

13. The disk brake apparatus as set forth in claim 3, further comprising additional engaging ribs such that the engaging rib and the additional engaging ribs are projectingly provided on a cylinder hole bottom side of the large-diameter cylinder portion at regular intervals in a circumferential direction.

14. The disk brake apparatus as set forth in claim 3, wherein a peripheral wall of the large-diameter cylinder portion is interposed between mutually adjoining ribs thereof and is extended toward a cylinder hole bottom portion.

15. The disk brake apparatus as set forth in claim 14, wherein the housing further comprises bendable pieces which engage with a peripheral wall of the fixed side cam plate.

16. The disk brake apparatus as set forth in claim 15, wherein the at least one engaging rib is a plurality of engaging ribs, the plurality of engaging ribs exist on a cylinder hole bottom portion and are interposed between mutually adjoining bent pieces, provide air gap portions comprising communication holes which allow communication between the inside and outside of the housing.

* * * * *